(12) United States Patent
Iwasawa et al.

(10) Patent No.: US 11,695,702 B2
(45) Date of Patent: Jul. 4, 2023

(54) PACKET FORWARDING APPARATUS, METHOD AND PROGRAM

(71) Applicant: Nippon Telegraph and Telephone Corporation, Tokyo (JP)

(72) Inventors: Hiroki Iwasawa, Tokyo (JP); Kenta Kawakami, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/284,930

(22) PCT Filed: Oct. 16, 2019

(86) PCT No.: PCT/JP2019/040689
§ 371 (c)(1),
(2) Date: Apr. 13, 2021

(87) PCT Pub. No.: WO2020/090474
PCT Pub. Date: May 7, 2020

(65) Prior Publication Data
US 2021/0352020 A1 Nov. 11, 2021

(30) Foreign Application Priority Data

Oct. 30, 2018 (JP) ................................. 2018-204049

(51) Int. Cl.
*H04L 47/2441* (2022.01)
*H04L 47/24* (2022.01)
*H04L 47/52* (2022.01)

(52) U.S. Cl.
CPC ...... *H04L 47/2441* (2013.01); *H04L 47/2458* (2013.01); *H04L 47/52* (2013.01)

(58) Field of Classification Search
CPC .. H04L 47/2441; H04L 47/2458; H04L 47/52
See application file for complete search history.

(56) References Cited

U.S. PATENT DOCUMENTS

2014/0321853 A1* 10/2014 Beshai ................ H04J 14/0284
398/52

FOREIGN PATENT DOCUMENTS

JP     2002-354000      12/2002
JP    2002354000 A  *  12/2002
(Continued)

OTHER PUBLICATIONS

Cisco.com, [online], "Diffserv—The Scalable End-to-End Quality of Service Model," Aug. 2005, retrieved on Apr. 12, 2021, retrieved from URL<https://www.cisco.com/en/US/technologies/tk543/tk766/technologies_white_paper09186a00800a3e2f.pdf>, 19 pages.
(Continued)

*Primary Examiner* — Siming Liu
(74) *Attorney, Agent, or Firm* — Fish & Richardson P.C.

(57) ABSTRACT

A packet transfer device 100 includes a packet classification unit 120 configured to classify received packets, queues 140 for respective classifications, priorities being set to the queues, a dequeue processing unit 150 configured to extract packets from the queue under a predetermined rule based on the priorities set to the queues, and a queue priority control unit 130 configured to perform control, upon detecting that a reception amount of packets related to a communication flow temporarily or intermittently increases from a reception amount under a normal condition, such that a priority of one of the queues holding the packets related to the communication flow is temporarily raised from a priority under the normal condition, during a period while the reception amount of packets related to the communication flow temporarily or intermittently increases.

9 Claims, 9 Drawing Sheets

(56) References Cited

FOREIGN PATENT DOCUMENTS

| JP | 2007-150914 | 6/2007 |
|----|-------------|--------|
| JP | 2008-205913 | 9/2008 |

OTHER PUBLICATIONS

Elbamby et al., "Towards Low-Latency and Ultra-Reliable Virtual Reality," IEEE Network, 2018, 32(2):78-84.
Nichols et al., "Controlled Delay Active Queue Management," Internet Engineering Task Force (IETF), RFC 8289, Jan. 2018, 25 pages.
Pan et al., "Proportional Integral Controller Enhanced (PIE): A Lightweight Control Scheme to Address the Bufferbloat Problem," Internet Engineering Task Force (IETF), RFC 8033, Feb. 2017, 30 pages.

* cited by examiner

| QUEUE | COMMUNICATION FLOW IDENTIFICATION INFORMATION (5tupelh HASH VALUE) | PRIORITY CLASS | BURST PERMISSION FLAG |
|---|---|---|---|
| QUEUE 1 | 51bff1afb8d6db3fa671bf933d7f0674 11cfd63ffa62e99dcbce9b17b0d908a2 | HIGH | True |
| QUEUE 2 | e776b2ab50662ead605920b285c3c9c2 42d672348f759674c319a4de88d85c03 | INTERMEDIATE | True |
| QUEUE 3 | 7a90d32bb53ca01aa15757c03aef30ae 1f3d3a97af93a0a4d77f7497e03698e0 | INTERMEDIATE | False |
| QUEUE 4 | 4eeafed43128755e77355fee088f4078 eb4fbe964cb6ce57c6a20d7a23fb7c7e | LOW | True |

PACKET FORWARDING APPARATUS, METHOD AND PROGRAM

CROSS-REFERENCE TO RELATED APPLICATIONS

This application is a National Stage application under 35 U.S.C. § 371 of International Application No. PCT/JP2019/040689, having an International Filing Date of Oct. 16, 2019, which claims priority to Japanese Application Serial No. 2018-204049, filed on Oct. 30, 2018. The disclosure of the prior application is considered part of the disclosure of this application, and is incorporated in its entirety into this application.

TECHNICAL FIELD

The present invention relates to a packet transfer device that transfers packets received from the external.

BACKGROUND ART

Packet transfer devices, such as switches and routers, typically include a packet classification unit that classifies received packets, queues that hold the classified packets for respective classifications, and a packet extraction unit that extracts the packets from the queues.

First In, First Out (FIFO) is the simplest queuing scheme in which arriving packets are sequentially provided in one queue, and are transmitted in order of the arrival. Methods of solving an increase in queuing delay of FIFO include Controlled Delay (CoDel) (see Non Patent Literature 1) and Proportional Integrated Controller Enhanced (PIE) (see Non Patent Literature 2) in which packet discarding probability is increased with increase in queuing delay.

Meanwhile, Differentiated Services (DiffServ) has been known as a representative solution for securing Quality of Service (QoS) of Internet communications (see Non Patent Literature 3). In DiffServ, communication flows are classified into several classes each of which is controlled with a priority given. Examples of the priority control method include Priority Queuing (PQ), Weighted Fair Queuing (WFQ), and Low Latency Queuing (LLQ). In the priority control method, packets in a high priority class are preferentially processed, or the band is guaranteed so as to ensure QoS. For IEEE 802.1, adoption of Time Sensitive Networking (TSN) has been under study. This enables QoS to be ensured through time synchronization between devices, time division transmission, and the like.

In recent years, Virtual Reality/Augmented Reality (VR/AR) has been widely used at full scale. Recently, VR can be easily experienced by providing a Head Mount Display (HMD) itself with a System on a Chip (SoC) or by attaching a smartphone to an HMD-type goggle. However, rendering performance and quality of experience achieved with such a configuration are inferior to those offered by a high-end HMD product using an expensive cutting edge Graphics Processing Unit (GPU). Still, high-end VR experience may be easily provided with images rendered by a GPU in a data center at a remote location transmitted to a lightweight terminal such as a smartphone. One type of VR in which a user wears an HMD is known to cause the user to feel sick due to a difference in an image provided and a human sense. This symptom is called VR sickness. One way of effectively avoiding VR sickness is that a time required for an action of a person to be reflected on an image on the HMD (known as Motion to Photon latency) is made equal to or less than 20 ms (see Non Patent Literature 4).

CITATION LIST

Non Patent Literature

Non Patent Literature 1: K. Nichols et al., "Controlled Delay Active Queue Management", IETF RFC 8289, January 2018, [online], [search on Oct. 9, 2018], Internet <URL: https://tools.ietf.org/html/rfc8289>

Non Patent Literature 2: R. Pan et al., "Proportional Integral Controller Enhanced (PIE): A Lightweight Control Scheme to Address the Bufferbloat Problem", IETF RFC 8033, February 2017, [online], [search on Oct. 9, 2018], Internet <URL: https://tools.ietf.org/html/rfc8033#ref-HPSR-PIE>

Non Patent Literature 3: Cisco Systems, "DIFFSERV-THE SCALABLE END-TO-END QUALITY OF SERVICE MODEL", 2005, [online], [search on Oct. 9, 2018], Internet <URL: http://www.cisco.com/en/US/technologies/tk543/tk766/technologies_white_paper09186a00800a 3e2f.pdf>

Non Patent Literature 4: Mohammed S. Elbamby, Cristina Perfecto, Mehdi Bennis, Klaus Doppler, "Towards Low-Latency and Ultra-Reliable Virtual Reality", IEEE Network, Vol. 32, pp. 87-84, April 2018

SUMMARY OF THE INVENTION

Technical Problem

When a VR video rendered in a data center at a remote location is transmitted using Internet Protocol (IP) packets with Maximum Transmission Unit (MTU) of 1500 bytes, each frame of a video having a full High Definition (HD) or a higher definition includes several tens to several hundreds of packets. This means that the transfer of all of these several tens to several hundreds of packets configuring one frame need to be completed within a time that is obtained by subtracting, from 20 ms, processing delay as a result of rendering, encoding, decoding, and the like.

With CoDel and PIE, queue delay can be reduced through packet discarding. This causes packet loss in real time video transmission, resulting in block noise or the like. Even though queuing delay of each packet can be reduced, this does not mean that transfer delay of all successive packets can be reduced.

The bandwidth may be guaranteed using PQ or the like. However, this requires 6% of a 10 Gbps line to be instantaneously occupied for transmitting 50 packets within 1 ms. This makes it difficult to guarantee bandwidths for all users when multiple priority communications are performed. Furthermore, the queuing delay also occurs even when the bandwidth guarantee and the priority control are performed. This happens when a plurality of communications with the identical priority are concurrently performed or when a packet of another flow arrives while several tens of packets, such as those in one frame of a video, is being transferred.

When TSN is employed, one frame can be transmitted on a flow-by-flow basis through time synchronization and time division transmission. However, this requires all end-to-end devices to support TSN. Moreover, video frames, which have non-uniform sizes, can reduce bandwidth usage efficiency. To identify a video frame, it is necessary to acquire information on an application protocol such as Real-time Transport Protocol (RTP). Thus, when a switch, a router, or the like identifies a video frame, the processing speed can be reduced.

The present invention has been made in view of the above circumstance, and an object of the present invention is to provide, to an application collectively transmitting a group of packets desired to be transmitted at once, a packet transfer device, method, and program for executing packet exchange processing of transferring all of a group of successive packets with low latency while maintaining fairness among communication flows with the identical priority.

Means for Solving the Problem

To achieve the above object, an invention according to the present application provides a packet transfer device configured to transmit received packets to an external, the packet transfer device including a packet classification unit configured to classify the received packets into classifications such that at least a series of packets related to an identical communication flow are classified into an identical classification, queues configured to hold the classified packets, each queue holding packets in one of the classifications, priorities being set to the queues, a dequeue processing unit configured to extract packets from the queues under a predetermined rule based on the priorities set to the queues, and a queue priority control unit configured to perform control, upon detecting that a reception amount of packets related to a communication flow temporarily or intermittently increases from a reception amount under a normal condition, such that a priority of one of the queues holding the packets related to the communication flow is temporarily raised from a priority under the normal condition, during a period while the reception amount of the packets related to the communication flow temporarily or intermittently increases.

An invention according to the present application provides a packet transfer device including a plurality of reception interfaces including buffers temporarily holding frames, a transmission interface including a buffer temporarily holding frames, and a packet processing unit configured to store, in queues, packets stored in the frames extracted from the buffers of the plurality of reception interfaces, extract the packets from the queues, and transfer the packets to the transmission interface, in which the packet processing unit includes a packet extraction unit configured to extract the packets from the reception interfaces under a predetermined rule based on priorities set to the reception interfaces, and an interface priority control unit configured to perform control, upon detecting that a reception amount of packets related to a communication flow temporarily or intermittently increases from a reception amount under a normal condition, such that a priority of one of the reception interfaces receiving the packets related to the communication flow is temporarily raised from a priority under the normal condition, during a period while the reception amount of the packets related to the communication flow temporarily or intermittently increases.

Effects of the Invention

With the present invention, upon detecting a group of packets corresponding to one video frame, such as a real time VR video traffic, that need to be transmitted with low latency, control is performed such that a priority of a queue/buffer holding this group of packets is temporarily raised from that under a normal condition, and then the priority is lowered after the group of packets have been transmitted. Thus, a group of successive packets can all be transferred with low latency while fairness is maintained among communication flows with the identical priority.

DESCRIPTION OF EMBODIMENTS

First Embodiment

Figure 1:
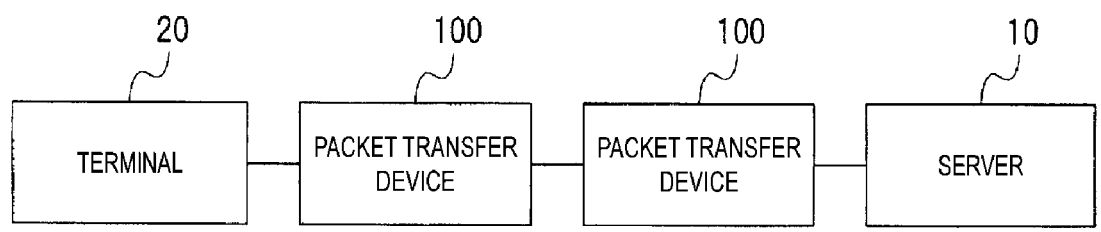
FIG. 1 is a diagram illustrating an overall configuration of a communication system according to a first embodiment.

A communication system according to a first embodiment of the present invention will be described with reference to the drawings. FIG. 1 is a diagram illustrating an overall configuration of the communication system according to the present embodiment.

As illustrated in FIG. 1, in the communication system according to the present embodiment, a server 10 and a terminal 20 communicate with each other via a plurality of packet transfer devices 100. The configuration of the communication system is not limited to the one illustrated in FIG. 1, and may be any configuration in which communication terminals, such as the server 10 and the terminal 20, are communicatively connected via the packet transfer devices 100.

The packet transfer device 100 is mainly formed of a semiconductor device, and can be configured as what is known as an information processing device including a Central Processing Unit (CPU), a volatile storage device such as a Random Access Memory (RAM), a non-volatile memory such as a hard disk and a flash memory, and a communication interface establishing connection for communicating with the external. The packet transfer device 100 is not limited to a physical network device such as a switch or a router, and includes a physical computer or a virtual computer on which a packet transfer program of the present invention runs.

In the present invention, the server 10 provides an application in which there is a time period during which a packet delivery amount per unit time temporarily or intermittently increases from that under a normal condition. In other words, in the present invention, the server 10 provides an application in which there is a time period during which a packet delivery time interval temporarily or intermittently becomes shorter than that under a normal condition.

In the following description, the event in which the packet delivery amount per unit time increases from that under the normal condition, in other words, the event in which the packet delivery time interval becomes shorter than that under the normal condition, will be referred to as a "burst." Thus, the server 10 provides an application that performs burst transmission temporarily or intermittently. One object of the packet transfer device 100 according to the present invention is that even when a burst occurs in a communication flow, a group of successive packets related to the burst are all transferred with low latency.

Figure 2:
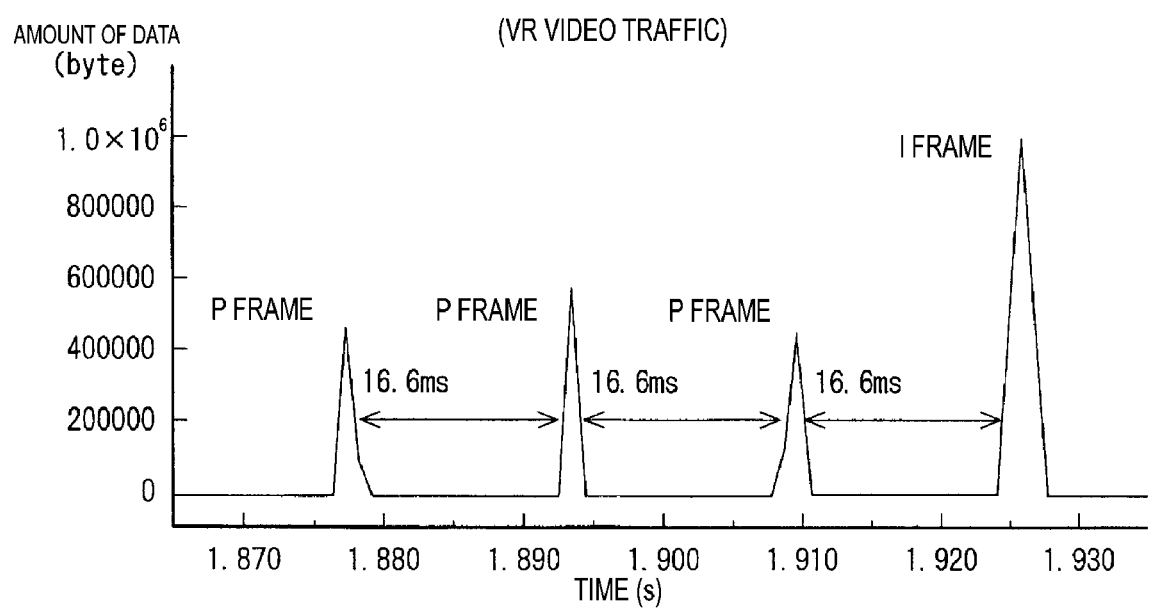
FIG. 2 illustrates an example of traffic assumed in the present invention.

The applications that perform burst transmission temporarily or intermittently include an application that transmits data that is larger than that under a normal condition temporarily or intermittently on an application level, and an application that successively transmits a larger amount of data than that under a normal condition temporarily or intermittently on an application level. In any of these applications, there is a time period during which a packet delivery amount per unit time temporarily or intermittently increases from that under a normal condition on a packet level. One example of such an application includes an application that performs burst transmission for encoded VR video frames at a frame rate interval, as illustrated in FIG. 2. Note that while the application that transmits video-related packets transmits the packets at a regular interval, the present invention is also effective for a non-uniform (non-constant) traffic.

The packet transfer device 100 according to the present embodiment performs queue management for each communication flow, and also allocates queues to classes with different priorities. The packet transfer device 100 performs queue control to allocate a queue for a certain communication flow to a prioritized class, only when a group of successive packets, such as those in one video frame, are transmitted. More specifically, the packet transfer device 100 performs queue control to allocate a queue for a certain communication flow to a class with a priority higher than that under a normal condition (non-burst condition/non-congestion condition), only when a group of successive packets, such as those in one video frame, are transmitted.

The packet transfer device 100 according to the present embodiment also utilizes an elapsed time from the arrival of the previous packet, in other words, an arrival interval of the packets related to the communication flow, for identifying the group of successive packets, that is, for identifying whether a burst is occurring.

After performing prioritized transmission of the group of successive packets, the packet transfer device 100 according to the present embodiment allocates the queue, the packet transmission of which has been prioritized, to a non-prioritized class for a certain period of time, so that fair queue control is performed. Here, the packet transfer device 100 according to the present embodiment controls a period during which the queue is in the non-prioritized class, that is, a period during which the priority of the queue is not returned to the priority under the normal condition, based on any appropriate combination of the following quantities. The following quantities include: the number of flows currently using the packet transfer device 100; the amount of packets transmitted from queues not in the prioritized class during the prioritized transmission control; and the amount of packets transmitted from a queue during which the priority of the queue is raised from that under the normal condition.

Figure 3:
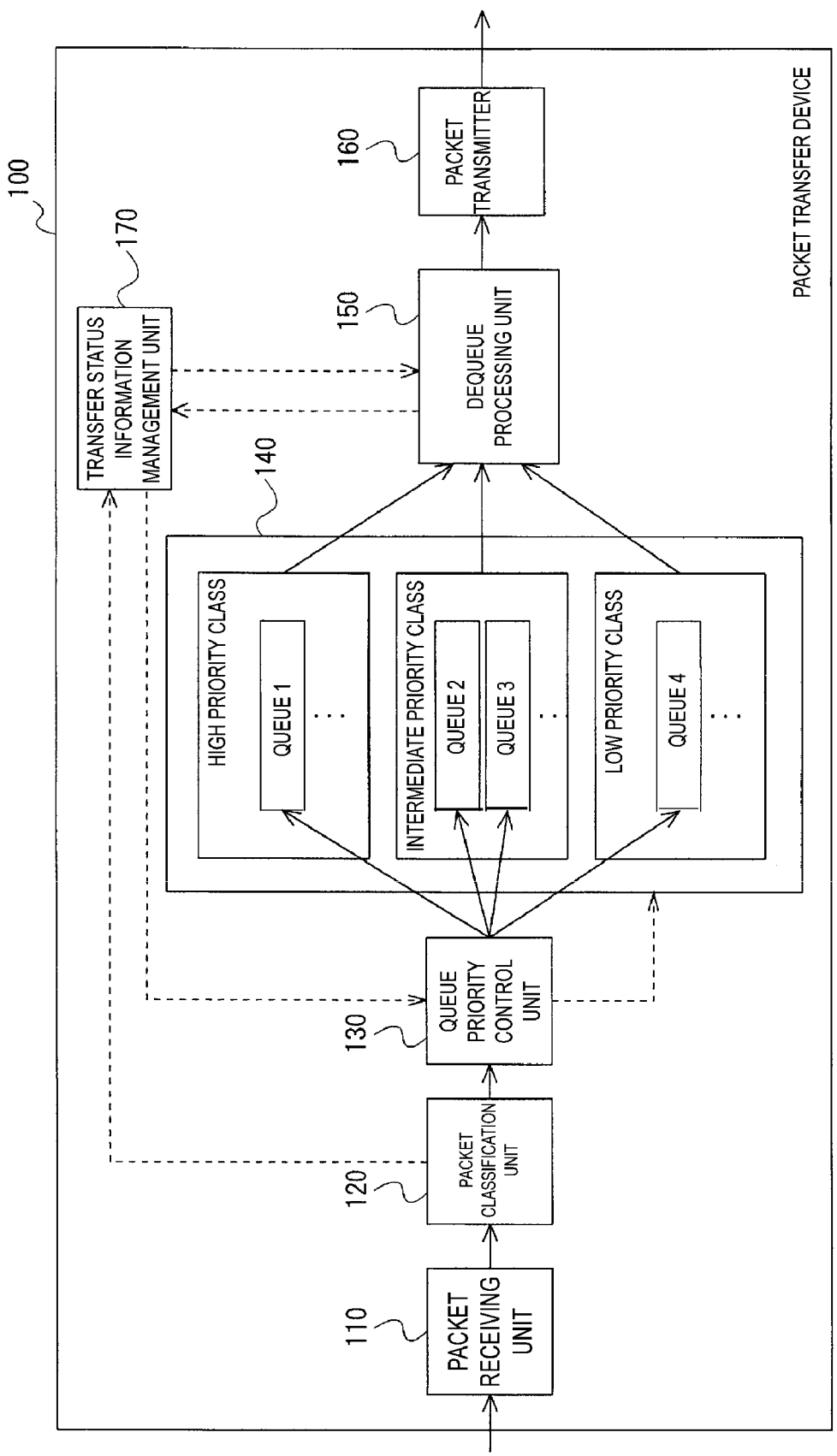
FIG. 3 is a functional block diagram of a packet transfer device according to the first embodiment.

Hereinafter, the present invention will be described with reference to an example of transmitting packets from the server 10 to the terminal 20. FIG. 3 is a functional block diagram of the packet transfer device according to the present embodiment. Note that only packet queuing relating to the spirit of the present application will be described herein, and other functions of the packet transfer device 100 such as routing processing or the like will be omitted.

The packet transfer device 100 includes a packet receiving unit 110, a packet classification unit 120, a queue priority control unit 130, a plurality of queues 140, a dequeue processing unit 150, a packet transmitter 160, and a transfer status information management unit 170. Here, the packet receiving unit 110 receives a packet from an external server, a terminal, other packet transfer devices, or the like. In addition, the packet classification unit 120 classifies the received packets on a flow-by-flow basis. Furthermore, the queue priority control unit 130 stores the packets classified by the packet classification unit 120 in the corresponding queues and dynamically controls the priorities of the queues. The queues 140 temporarily store the packets classified by the packet classification unit 120. In addition, the dequeue processing unit 150 extracts the packet at the top of any of the queues 140 in accordance with the priority classes. The packet transmitter 160 transmits the extracted packet to an external device. The transfer status information management unit 170 acquires information from the packet classification unit 120 and the dequeue processing unit 150 to manage packet transfer status information including the number of communication flows (active flows) currently using the packet transfer device 100, and the number of packets transferred by the packet transfer device 100.

This communication flow is a group of packets with the identical 5-tuple including transmission/reception IP addresses, transmission/reception ports, and a protocol number, or the identical combination of any of transmission/reception IP addresses, transmission/reception ports, and a protocol number. In the present embodiment, the packet classification unit 120 calculates a hash value from the 5-tuple value (5-tuple hash value), and identifies the communication flow based on this hash value.

The queue 140 is provided for each communication flow. Each queue 140 belongs to any of the high priority class, the intermediate priority class, or the low priority class. The dequeue processing unit 150 fairly gives opportunity for packet transmission to the queues belonging to the identical priority class. The queues belonging to the intermediate priority class are given the opportunity for packet transmission, only when no packets are accumulated in the queues belonging to the high priority class. The queues belonging to the low priority class are given the opportunity for packet transmission, only when no packets are accumulated in the queues belonging to the high or the intermediate priority class. Furthermore, each queue 140 has an attribute indicating whether to permit execution of burst transfer control according to the present invention.

Figures 4, 5:
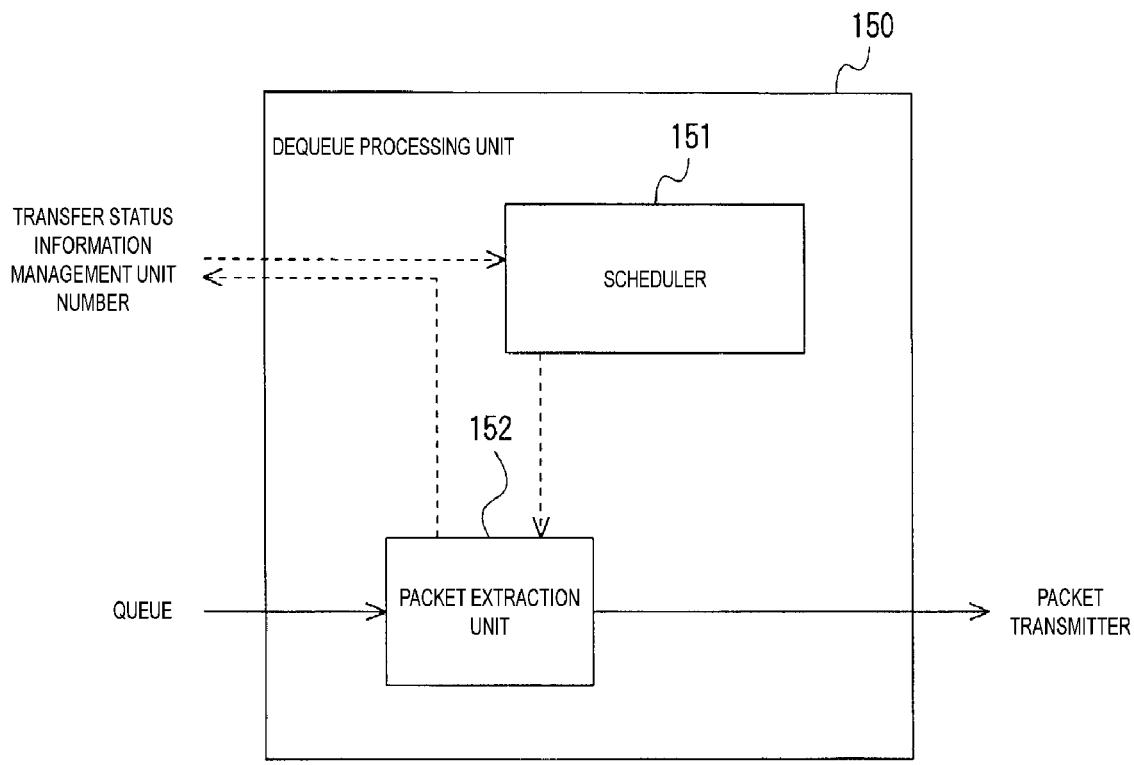
FIG. 4 illustrates an example of queue management information.
FIG. 5 is a functional block diagram of a dequeue processing unit.

The packet transfer device 100 stores and manages queue management information as illustrated in FIG. 4, for example, to manage the attributes of each queue 140. As illustrated in FIG. 4, the queue management information includes a 5-tuple hash value identifying a communication flow corresponding to each queue 140, a priority class allocated to the queue 140, and a burst permission flag indicating whether to permit execution of the burst transfer control according to the present invention. Where the queue management information is provided is not limited.

FIG. 5 is a functional block diagram of the dequeue processing unit 150. The dequeue processing unit 150 includes a scheduler 151 and a packet extraction unit 152. Here, the scheduler 151 manages the states of the queues 140, determines how much packets are to be transmitted from which queue 140, and then issues an instruction to the packet extraction unit. The packet extraction unit 152 extracts a packet from the queue 140 on the basis of the instruction from the scheduler 151.

The packet extraction unit 152 notifies the transfer status information management unit 170 of how much packets are extracted from which queue 140. The scheduler 151 reflects, on the scheduling, the number of active flows acquired from the transfer status information management unit 170. The packet extraction unit 152 transmits, to the packet transmitter 160, the packet extracted from the queue 140 based on the instruction from the scheduler 151.

Figure 6:
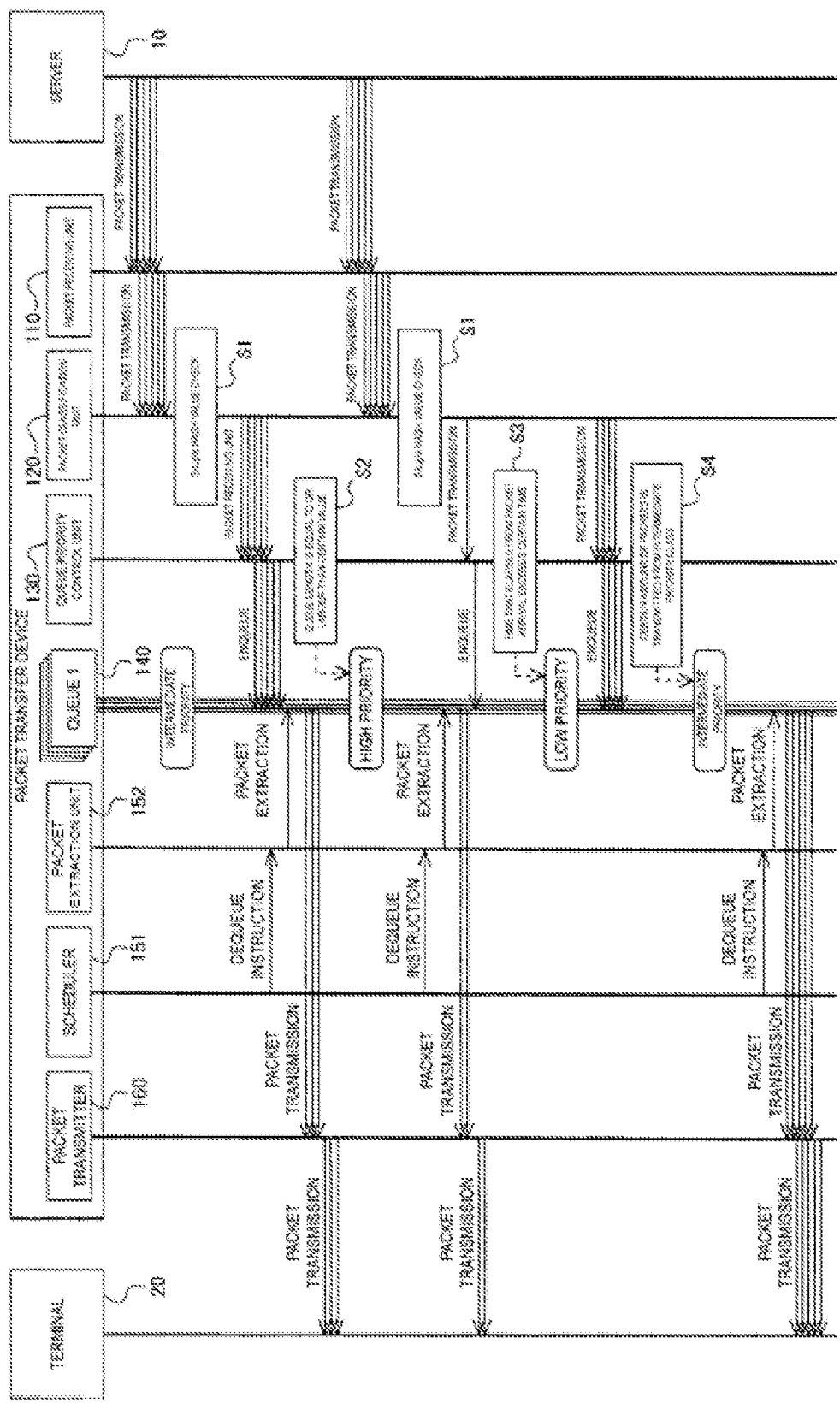
FIG. 6 is an example of a sequence chart of packet transfer processing.

Functions and operations of the components of the packet transfer device 100 of the present invention will be described below with reference to FIG. 6 and FIG. 7. FIG. 6 illustrates an example of a sequence chart of packet transfer processing, and FIG. 7 is an example of a flowchart of queue priority control processing.

As illustrated in FIG. 6, packets arriving at the packet receiving unit 110 are identified as each communication flow by the packet classification unit 120 based on the 5-tuple hash value (step S1). When a packet of the received packets is the first packet in the communication flow, in other words, when the corresponding queue is not registered in the queue management information, the packet classification unit 120 reserves a storage region for a new queue 140, and adds attribute information on the new queue 140 to the queue management information. The packet classification unit 120 determines whether to perform the burst transfer control according to the present invention on the communication flow, and sets the priority class of the queue management information to the intermediate priority as an initial value, when the control is determined not to be performed. On the other hand, upon determining to perform the burst transfer control according to the present invention on the communication flow, the packet classification unit 120 sets the burst permission flag in the queue management information, and sets the priority class of the queue management information to the intermediate priority as the initial value. The flow for which the burst transmission (burst permitted flow) is permitted first belongs to the intermediate priority class. However, under the non-congestion condition, no packets are accumulated in the queues 140 in the first place, and thus packets of the burst permitted flow and other communication flows are fairly transmitted.

When a packet is received from the packet classification unit 120, the queue priority control unit 130 stores the received packet in the corresponding queue 140, and performs control for changing the priority of the queue 140. Control processing of changing the queue priority by the queue priority control unit 130 will be described below. Note that the change in the queue priority is performed by changing the priority class in the queue management information.

Figure 7:
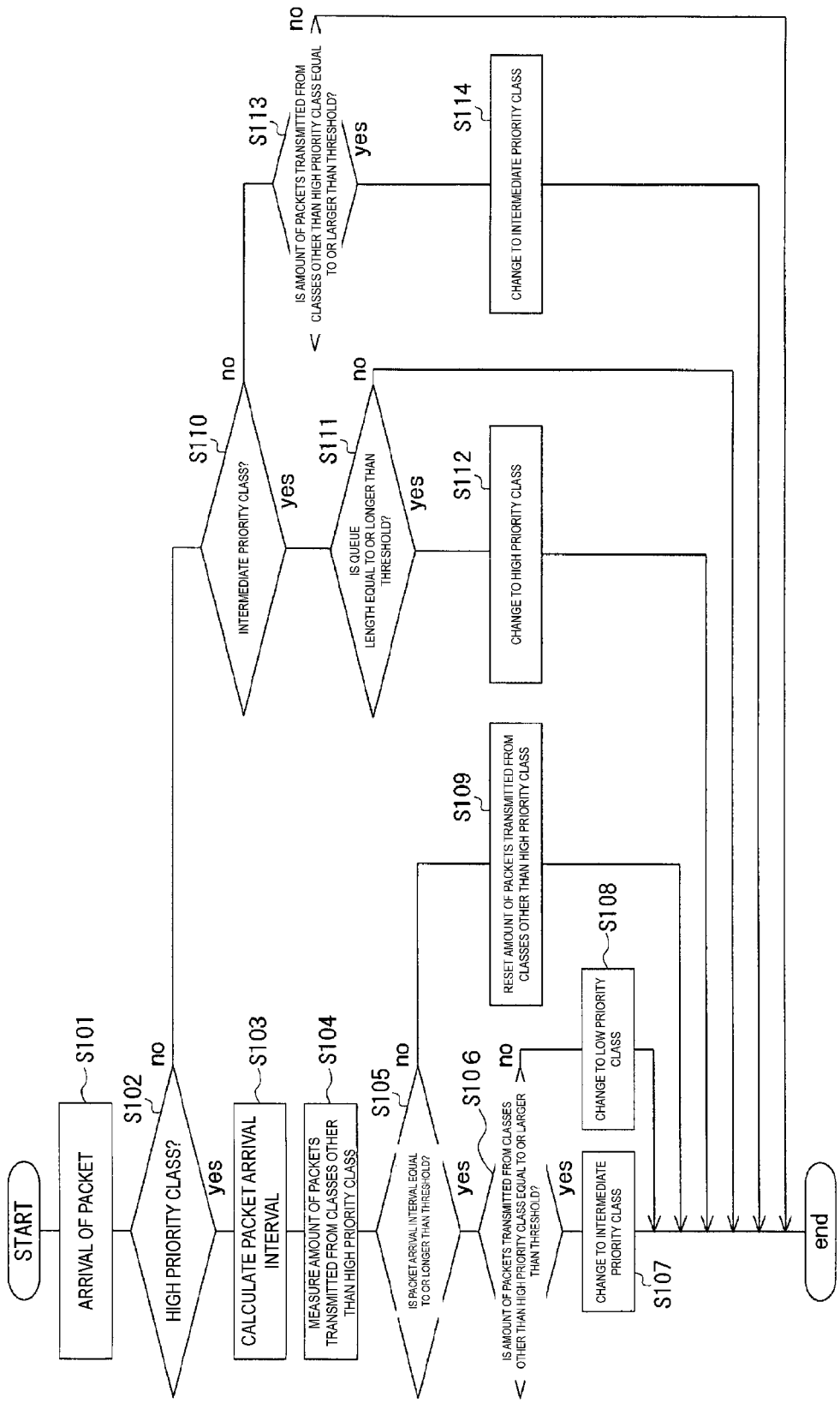
FIG. 7 is an example of a flowchart of queue priority control processing.

When congestion occurs, and the queue 140 for the burst permitted flow currently in the intermediate priority class accumulates a certain number of packets, the queue priority control unit 130 performs control to change the priority of the queue 140 to the high priority class and prioritizes the transmission of the packets in the queue (step S2 in FIG. 6 and steps S110 to S112 in FIG. 7).

For each queue 140 in the high priority class, the queue priority control unit 130 uses the transfer status information management unit 170 to measure the cumulative number of packets transmitted while the queue belongs to the high priority class. Furthermore, each time a packet arrives, the queue priority control unit 130 uses a time stamp value to calculate a time that elapses from the arrival of the previous packet. Furthermore, each time a packet arrives, the queue priority control unit 130 measures the number of packets transmitted from the classes other than the high priority class after the arrival of the previous packet (steps S103 and S104 of FIG. 7).

When the time that elapses from the arrival of the previous packet does not exceed a certain period of time, the queue priority control unit 130 resets the number of packets transmitted from the classes other than the high priority class and maintains the priority class of the queue at the high priority class (steps S105 and S109 of FIG. 7).

On the other hand, when the time that elapses from the arrival of the previous packet exceeds the certain time, the queue priority control unit 130 determines that the packets are not a series of packets to be burst transmitted, and thus changes the priority class of the queue 140 for the burst permitted flow to the low priority class (step S3 in FIG. 6, and steps S105 and S108 in FIG. 7). When the number of packets transmitted from the classes other than the high priority class after the arrival of the previous packet exceeds a certain value, it is determined that packets of the burst permitted flow and the other flows can be fairly transmitted, and thus the priority class of the queue is immediately changed to the intermediate priority class (step S4 in FIG. 6 and step S106 and S107 in FIG. 7). When the number of packets transmitted from the classes other than the high priority class after the arrival of the previous packet does not exceed a threshold, the priority class of the queue is maintained at the low priority class until the certain value is exceeded (steps S113 and S114 in FIG. 7).

The dequeue processing unit 150 extracts a packet from each queue 140 based on the priority class of the queue 140, and transmits the packet to the external terminal 20 through the packet transmitter 160.

Note that in step 105 of FIG. 7 described above, the packet arrival interval is compared with the predetermined threshold. This threshold may be fixed or may be dynamically determined based on the packet arrival interval in the past for example. In the latter case, a group of packets arriving at nonuniform intervals can be identified as a group of successive packets.

With the processing described above, the priority control is performed only when a group of packets related to the burst transmission are transmitted, and then the priority for packet transmission is lowered for a certain period of time. This enables fairness to be maintained between such a communication for burst transmission and other communications. Furthermore, as the threshold for determining whether the packet transmission is performed with the opportunity fairly given to other flows in step S107 described above, the number of cumulative packets transmitted while the burst permitted flow belongs to the high priority class, and a moving average of the cumulative numbers of packets in the past plural times are used. This enables the fairness to be maintained even when the amount of burst transmission is dynamically changed. Furthermore, a jitter value calculated from the packet arrival interval in the past and the like may be used for dynamically determining the threshold for the packet arrival interval for estimating a group of packets.

As described above, the packet transfer device 100 according to the present embodiment estimates, based on the packet arrival interval, a group of packets in one video frame that needs to be transmitted with low latency, as in the case of real time VR video traffic. This allows for control on a video frame-by-video frame basis, through control at or below Layer 4.

Furthermore, with the packet transfer device 100 according to the present embodiment, a group of packets in one video frame are identified and preferentially transmitted, whereby queuing delay of video traffic can be reduced even when slight congestion occurs.

Furthermore, with the packet transfer device 100 according to the present embodiment, a group of packets are preferentially transmitted, and then packet transmission of the corresponding flow is controlled to be limited and/or not prioritized. Thus, other communication traffic can be also fairly transferred.

Furthermore, with the packet transfer device 100 according to the present embodiment, a period during which the packet transmission is limited and/or is not prioritized is calculated on the basis of the number of communication flows currently using the packet transfer device 100 and the number of packets transmitted from the classes other than the high priority class that is calculated for each queue. Thus, fair control can be achieved regardless of the number of communication flows.

Furthermore, with the packet transfer device 100 according to the present embodiment, the threshold for the packet arrival interval for identifying a group of packets desired to be collectively transmitted is determined on the basis of the packet arrival interval in the past. Thus, the group of packets can be identified even when arriving at non-uniform intervals.

Second Embodiment

Figure 8:
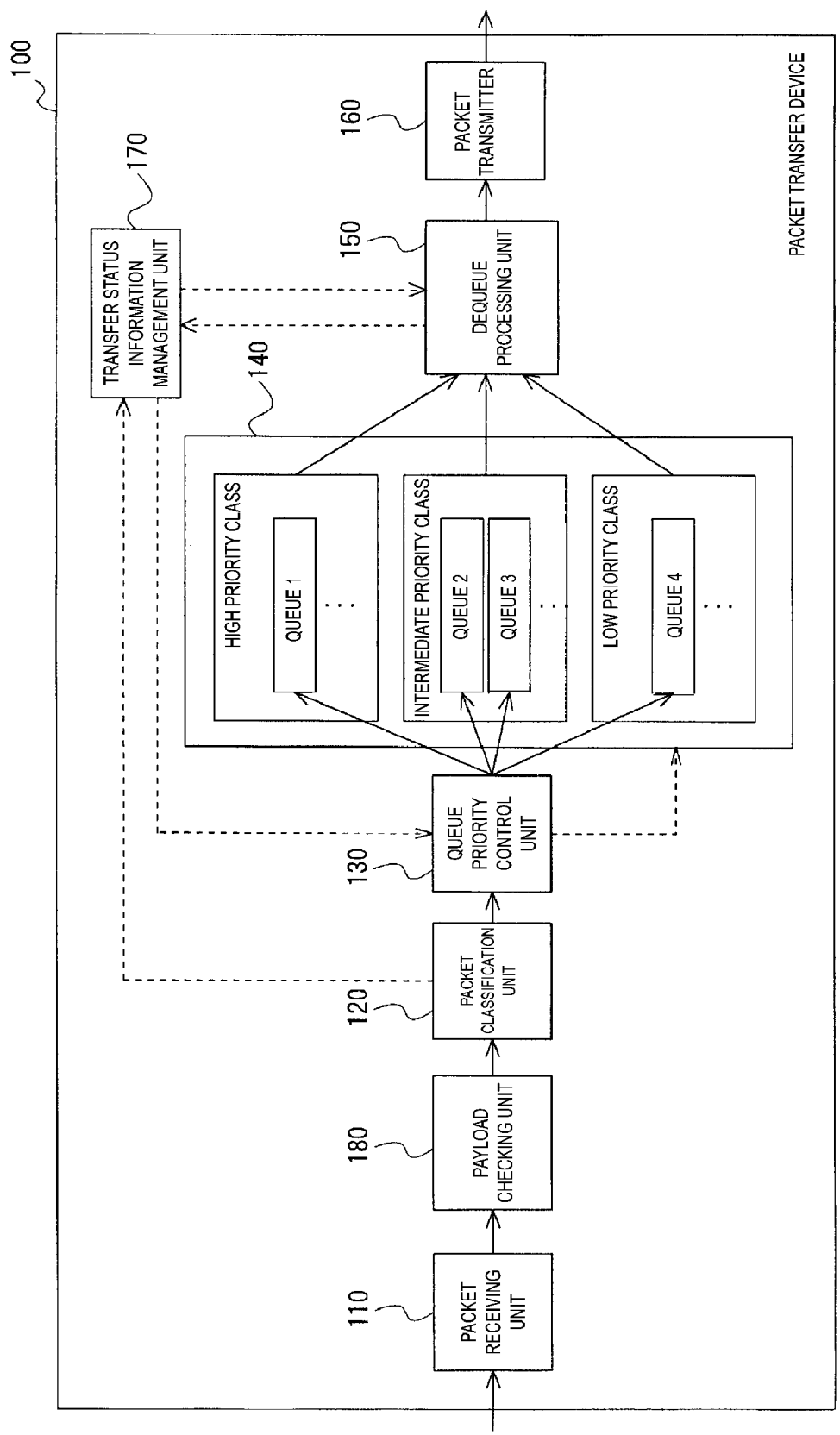
FIG. 8 is a functional block diagram of a packet transfer device according to a second embodiment.

A packet transfer device according to a second embodiment of the present invention will be described with reference to the drawings. FIG. 8 is a diagram illustrating an overall configuration of the packet transfer device according to the present embodiment.

The packet transfer device 100 according to the present embodiment differs from the packet transfer device according to the first embodiment in that information in a storage region obtained by shifting by a fixed bit length from the top of the packet header on the application level is used to identify a group of successive packets, that is, identify whether a burst is occurring. This difference will be described below.

As illustrated in FIG. 8, the packet transfer device 100 according to the present embodiment includes a payload checking unit 180 that directly refers to an application protocol header before a packet is sorted to the queue 140. The other configuration is the same as that in the first embodiment.

The payload checking unit 180 constantly refers to a region obtained by shifting by a fixed length from the top of the payload in the transport layer (L4), and acquires information for identifying a group of successive packets included in the higher layers.

Figure 9:
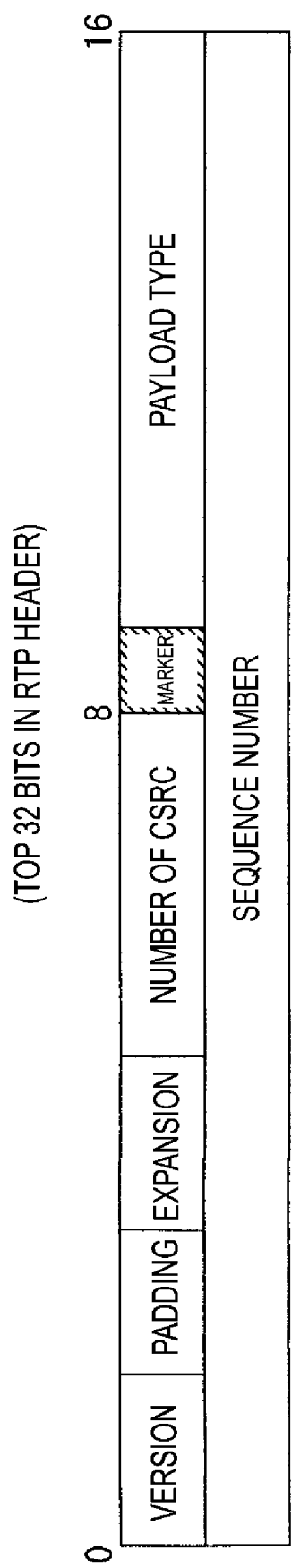
FIG. 9 is a diagram illustrating a header structure of an RTP packet.

For example, as illustrated in FIG. 9, in many payload types of RTP headers, a marker region at the ninth bit from the top is used as a flag indicating the final packet of a video frame. Thus, the video frame can be identified by simply referring to the ninth bit, instead of measuring the packet arrival interval.

Unlike the first embodiment, the packet transfer device 100 according to the present embodiment does not measure the packet arrival interval and changes the priority class from the high priority class to the low priority class when the payload checking unit 180 recognizes the packet indicating the end of the group of successive packets. The packet transfer device 100 measures the number of packets transmitted from the classes other than the high priority class.

Third Embodiment

Figure 10:
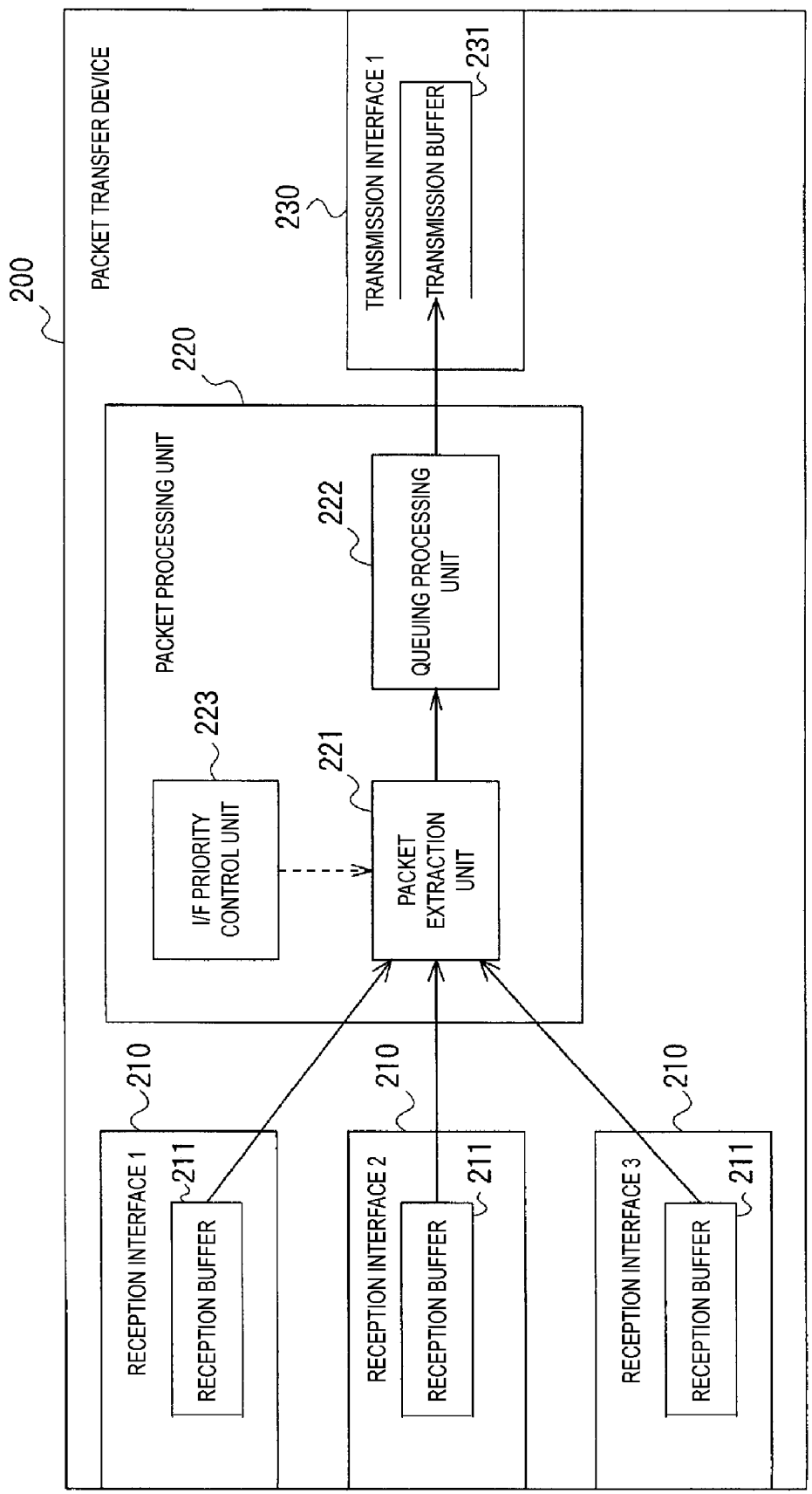
FIG. 10 is a functional block diagram of a packet transfer device according to a third embodiment.

A packet transfer device according to a third embodiment of the present invention will be described with reference to the drawings. FIG. 10 is a diagram illustrating an overall configuration of the packet transfer device according to the present embodiment.

A packet transfer device, such as a router, commonly includes a plurality of reception interfaces and transmission interfaces. The dequeue processing of the transmission interface is described in the first and the second embodiments. In other words, the queuing processing according to the first and second embodiments described above is executed when each packet received by the corresponding reception interface and subjected to routing processing and the like as appropriate is transmitted to the transmission interface.

On the other hand, a packet transfer device 200 according to the present embodiment applies the algorithm of the present invention also to enqueuing processing by the reception interface, that is, to processing of burst enqueuing of packets from a certain reception interface.

As illustrated in FIG. 10, the packet transfer device 200 according to the present embodiment includes a plurality of reception interfaces 210 including buffers 211 that temporarily hold packets, a packet processing unit 220, and a transmission interface 230 including a buffer 231 that temporarily holds packets.

The packet transfer device 200 is mainly formed of a semiconductor device, and can be configured as what is known as an information processing device including a Central Processing Unit (CPU), a volatile storage device such as a Random Access Memory (RAM), a non-volatile memory such as a hard disk and a flash memory, and a communication interface establishing connection for communicating with the external. The packet transfer device 200 is not limited to a physical network device such as a switch or a router, and includes a physical computer or a virtual computer on which the packet transfer program of the present invention runs.

The packet processing unit 220 includes a packet extraction unit 221 and a queuing processing unit 222. Here, the packet extraction unit 221 extracts packets held in the buffers 211 of the reception interfaces 210. The queuing processing unit 222 stores the packets, extracted by the packet extraction unit 221, in a queue (not illustrated) and transfers the packets extracted from the queue in accordance with a predetermined queuing algorithm to the transmission interface 230. The queuing algorithm used by the queuing processing unit 222 is not limited, and a related-art algorithm can be used.

In the present embodiment, the packet extraction unit 221 extracts the packets from the buffers 211 of the plurality of reception interfaces 210 according to an algorithm similar to those according to the first and the second embodiments described above. Still, a heavy load is imposed when flow classification processing is performed based on the 5-tuple by the reception interface 210. Thus, the priority may be allocated, for example, on an interface-by-interface basis, instead of a flow-by-flow basis.

In view of this, in the present embodiment, the priorities are allocated to the plurality of reception interfaces 210, and the packet extraction unit 221 extracts packets from the buffer 211 of any of the reception interfaces 210 under a predetermined rule based on the priorities. As illustrated in FIG. 10, the packet processing unit 220 includes an interface priority control unit 223. The interface priority control unit 223 performs the following control upon detecting a temporary or intermittent increase in the amount of received packets related to a communication flow from that in the normal condition, that is, upon detecting an occurrence of a burst. This following control is control for temporarily raising the priority of the reception interface that receives the packets related to the communication flow from that under the normal condition, during a period of the temporary or intermittent increase. The priority change control by the interface priority control unit 223 is the same as those in the first and the second embodiments.

While the embodiment of the present invention has been described in detail in the above, the present invention is not limited to the above embodiment. For example, in the first and second embodiments, the communication flow is identified based on 5-tuple. Alternatively, the communication flow may be identified based on a combination of any appropriate elements of 5-tuple.

In the embodiments described above, any of three levels (high, intermediate, and low) is allocated as the priority of each of the queues 140 and the reception interfaces 210. Alternatively, a more detailed level may be allocated as the priority.

Furthermore, in each of the above-described embodiments, the determination processing is executed based on the amount of data in the queue 140 held in the communication flow, to detect the transitioning to the burst period. Alternatively, the determination processing may also be performed based on the packet arrival interval for detecting the transitioning to the burst period, as in the detection of the transition from the burst period to the normal condition. This burst period is a period during which the reception amount of packets related to a communication flow temporarily or intermittently increases from that under the normal condition.

REFERENCE SIGNS LIST

10 Server
20 Terminal
100 Packet transfer device
110 Packet receiving unit
120 Packet classification unit
130 Queue priority control unit
140 Queue
150 Dequeue processing unit
151 Scheduler
152 Packet extraction unit
160 Packet transmitter
170 Transfer status management unit
180 Payload checking unit

The invention claimed is:

1. A packet transfer device configured to transmit received packets to an external device, the packet transfer device comprising:
a packet classification unit, implemented with one or more processors, configured to classify the received packets into classifications as classified packets such that at least a series of packets related to an identical communication flow are classified into an identical classification;
queues, implemented with the one or more processors, configured to hold the classified packets, each queue holding packets in one of the classifications, priorities being set to the queues;
a dequeue processing unit, implemented with the one or more processors, configured to extract packets from the queues under a predetermined rule based on the priorities set to the queues; and
a queue priority control unit, implemented with the one or more processors, configured to perform control, upon detecting that a reception amount of packets related to a communication flow temporarily or intermittently increases from a reception amount under a normal condition, such that a priority class of one of the queues holding the packets related to the communication flow is temporarily raised to a high priority class from a lower priority class under the normal condition, during a period while the reception amount of the packets related to the communication flow temporarily or intermittently increases,
wherein the queue priority control unit is configured to detect that the reception amount of the packets related to the communication flow temporarily or intermittently increases from the reception amount under the normal condition, based on information stored in a payload of each received packet and stored in a header on an application level, and perform control, upon detecting that the reception amount of the packets is returned to the reception amount under the normal condition, such that the high priority class of the one of the queues holding the packets is temporarily lowered and then set to the lower priority class under the normal condition.

2. The packet transfer device according to claim 1, wherein the queue priority control unit detects that the reception amount of the packets related to the communication flow temporarily or intermittently increases from the reception amount under the normal condition, based on an arrival interval of the packets related to the communication flow.

3. The packet transfer device according to claim 1, wherein the queue priority control unit determines a time at which the high priority class of the one of the queues is set to the lower priority class under the normal condition based on a combination of a number of other communication flows, a transmission amount of packets related to the other communication flows from the packet transfer device, the number of other communication flows and the transmission amount of packets related to the other communication flows being ones after the high priority class of the one of the queues is temporarily lowered from the high priority class under the normal condition, and a transmission amount of packets from the one of the queues in the period during which the high priority class of the one of the queues is raised from the low priority class under the normal condition.

4. A packet processing method performed by a packet transfer device configured to transmit received packets to an external device, the packet transfer device including a packet classification unit configured to classify the received packets into classifications as classified packets such that at least a series of packets related to an identical communication flow are classified into an identical classification, queues configured to hold the classified packets, each queue holding packets in one of the classifications, priorities being set to the queues, and a dequeue processing unit configured to extract packets from the queues under a predetermined rule based on the priorities set to the queues, the method comprising:

performing, by a queue priority control unit, a control, upon detecting that a reception amount of packets related to a communication flow temporarily or intermittently increases from a reception amount under a normal condition, such that a priority class of one of the queues holding the packets related to the communication flow is raised to a high priority class from a lower priority class under the normal condition, during a period while the reception amount of the packets related to the communication flow temporarily or intermittently increases; and performing, by the queue priority control unit, a control, upon detecting that the reception amount of the packets is returned to the reception amount under the normal condition, such that the high priority class of the one of the queues holding the packets is temporarily lowered and then set to the lower priority class under the normal condition;

wherein the detecting, by the queue priority control unit, that the reception amount of the packets related to the communication flow temporarily or intermittently increases from the reception amount under the normal condition is based on information stored in a payload of each received packet and stored in a header on an application level.

5. The packet processing method according to claim 4, wherein the detecting, by the queue priority control unit, that the reception amount of the packets related to the communication flow temporarily or intermittently increases from the reception amount under the normal condition is based on an arrival interval of the packets related to the communication flow.

6. The packet processing method according to claim 4, comprising:

determining, by the queue priority control unit, a time at which the high priority class of the one of the queues is set to the lower priority class under the normal condition is based on a combination of a number of other communication flows, a transmission amount of packets related to the other communication flows from the packet transfer device, the number of other communication flows and the transmission amount of packets related to the other communication flows being ones after the high priority class of the one of the queues is temporarily lowered from the high priority class under the normal condition, and a transmission amount of packets from the one of the queues in the period during which the high priority class of the one of the queues is raised from the low priority class under the normal condition.

7. A non-transitory computer readable medium comprising a packet processing program that causes a computer to operate as respective functional units of a packet transfer device comprising: performing, by a queue priority control unit, a control, upon detecting that a reception amount of packets related to a communication flow temporarily or intermittently increases from a reception amount under a normal condition, such that a priority class of a queue holding the packets related to the communication flow is raised to a high priority class from a lower priority class under the normal condition, during a period while the reception amount of the packets related to the communication flow temporarily or intermittently increases; and performing, by the queue priority control unit, a control, upon detecting that the reception amount of the packets is returned to the reception amount under the normal condition, such that the high priority class of the one of the queues holding the packets is temporarily lowered and then set to the lower priority class under the normal condition;

wherein the detecting, by the queue priority control unit, that the reception amount of the packets related to the communication flow temporarily or intermittently increases from the reception amount under the normal condition is based on information stored in a payload of each received packet and stored in a header on an application level.

8. The non-transitory computer readable medium according to claim 7, wherein the detecting that the reception amount of the packets related to the communication flow temporarily or intermittently increases from the reception amount under the normal condition is based on an arrival interval of the packets related to the communication flow.

9. The non-transitory computer readable medium according to claim 7, comprising:

performing, by the queue priority control unit, determination of a time at which the high priority class of the one of the queues is set to the lower priority class under the normal condition is based on a combination of a number of other communication flows, a transmission amount of packets related to the other communication flows from the packet transfer device, the number of other communication flows and the transmission amount of packets related to the other communication flows being ones after the high priority class of the one of the queues is temporarily lowered from the high priority class under the normal condition, and a transmission amount of packets from the one of the queues in the period during which the high priority class of the one of the queues is raised from the low priority class under the normal condition.

* * * * *